UNITED STATES PATENT OFFICE.

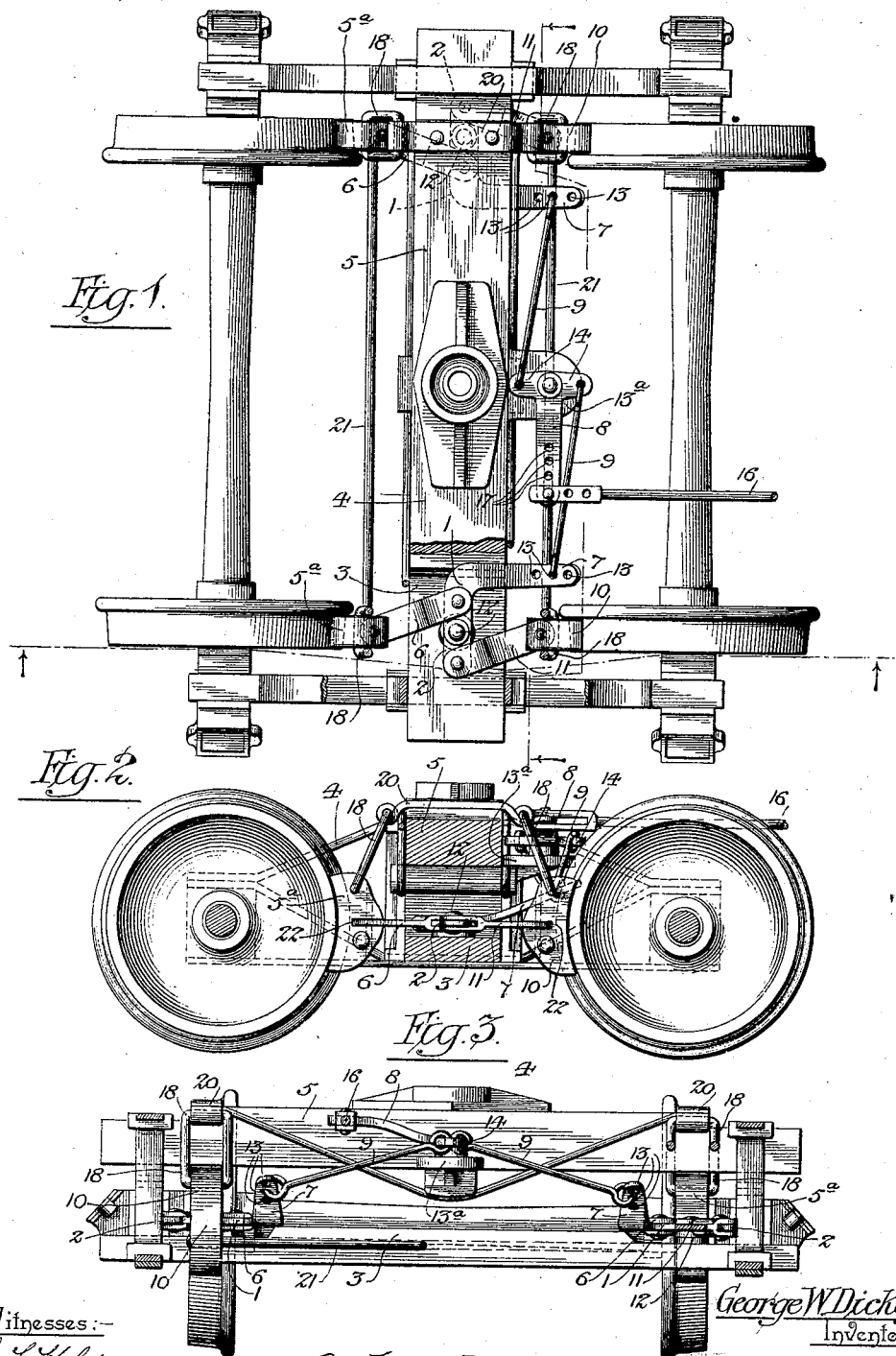

GEORGE WASHINGTON DICKEY, OF HUNTINGTON, WEST VIRGINIA.

CAR-BRAKE.

SPECIFICATION forming part of Letters Patent No. 615,819, dated December 13, 1898.

Application filed January 25, 1898. Serial No. 667,864. (No model.)

*To all whom it may concern:*

Be it known that I, GEORGE WASHINGTON DICKEY, a citizen of the United States, residing at Huntington, in the county of Cabell and State of West Virginia, have invented a new and useful Car-Brake, of which the following is a specification.

The invention relates to improvements in car-brakes.

The object of the present invention is to improve the construction of car-brakes and to provide a simple, inexpensive, and effective one which will be strong and durable and adapted to be applied to any truck and capable of operation by hand or other power.

The invention consists in the construction and novel combination and arrangement of parts, as hereinafter fully described, illustrated in the accompanying drawings, and pointed out in the claims hereto appended.

In the drawings, Figure 1 is a plan view, partly in section, of a truck provided with a brake constructed in accordance with this invention. Fig. 2 is a vertical sectional view of one side of the truck. Fig. 3 is a transverse sectional view of the truck.

Like numerals of reference designate corresponding parts in all the figures of the drawings.

1 1 designate the L-shaped brake-levers, fulcrumed intermediate of the ends of their short arms 2 on the spring-board 3 of a truck 4 in the space between the spring-board and the bolster 5. The short arms 2, which are disposed transversely of the truck, extend outward from the angles of the levers 1 and are connected at their outer ends with brake-shoes $5^a$ by link-bars 6. The long arms 7 of the L-shaped levers are disposed longitudinally of the truck and are connected with a T-shaped operating-lever 8 by transverse rods 9. The short arms of the L-shaped levers are connected at their inner terminals with brake-shoes 10 by link-bars 11. The link-bars 6 and 11 are located at opposite sides of the pivot 12, and when the L-shaped lever is oscillated the brake-shoes are simultaneously operated and moved inward or outward, according to the direction of movement of the lever 1.

The L-shaped levers are provided at the outer portions of their arms 7 with perforations 13 to permit the transverse rods 9 to be adjusted on the levers for regulating the force with which the brake-shoes are applied to the wheels. The T-shaped operating-lever, which is fulcrumed on a suitable bracket or support $13^a$ at the center of the truck, has its short arms 14 disposed longitudinally of the same when the brake-shoes are off the wheels, and by swinging the long arm of the T-shaped lever from its transverse position toward a position longitudinally of the truck the brake-shoes are applied to the wheels. An operating-rod 16 is connected with the long arm of the T-shaped lever, which is provided with perforations 17 for adjusting the operating-rod, and the latter may be connected with any suitable operating mechanism, so that the brake may be applied by hand or by compressed air or other means.

The brake-shoes $5^a$ and 10 are suspended from the truck by oblong hangers 18, hinged at their upper ends to straps or bars 20, which are secured to and disposed transversely of the upper face of the truck-bolster. Each pair of brake-shoes has its members connected by a transverse rod 21, and the outer ends of the link-bars are pivoted in substantially horizontal recesses 22 of the brake-shoes.

The invention has the following advantages: The brake, which is simple, inexpensive, strong, and durable, is applicable to the various styles of car-trucks, and while being effective it is capable of operation by hand, compressed air, or other means. The parts are capable of ready adjustment to vary the leverage and produce the necessary pressure on the car-wheels.

Changes in the form, proportion, and minor details of construction may be resorted to without departing from the spirit or sacrificing any of the advantages of this invention.

What I claim is—

1. In a car-brake, the combination with a truck, of brake-shoes, L-shaped levers fulcrumed between the ends of one of their arms and connected with the brake-shoes at opposite sides of the fulcrum-point, and a centrally-arranged T-shaped lever having its short arms connected with the other arms of said levers, substantially as described.

2. In a car-brake, the combination of a truck, brake-shoes suspended therefrom, L-shaped levers located at opposite sides of the truck and fulcrumed thereon at a point between the ends of their short arms, link-bars located at opposite sides of the fulcrum-points and connected with the brake-shoes, a centrally-arranged T-shaped lever mounted on the truck, and transverse rods connecting the short arms of the T-shaped lever with the long arms of the L-shaped levers, substantially as described.

In testimony that I claim the foregoing as my own I have hereto affixed my signature in the presence of two witnesses.

GEORGE WASHINGTON DICKEY.

Witnesses:
S. R. WALLACE,
H. STEWART POTTS.